(12) United States Patent
Zhu (10) Patent No.: US 11,677,555 B2
(45) Date of Patent: *Jun. 13, 2023

(54) IDENTITY AUTHENTICATION, NUMBER SAVING AND SENDING, AND NUMBER BINDING METHOD, APPARATUS AND DEVICE

(71) Applicant: ADVANCED NEW TECHNOLOGIES CO., LTD., Grand Cayman (KY)

(72) Inventor: Jinbiao Zhu, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,762

(22) Filed: Oct. 4, 2021

(65) Prior Publication Data

US 2022/0029809 A1 Jan. 27, 2022

Related U.S. Application Data (63) Continuation of application No. 17/162,314, filed on Jan. 29, 2021, now Pat. No. 11,177,956, which is a
(Continued)

(30) Foreign Application Priority Data

Oct. 25, 2018 (CN) .......................... 201811248773.6

(51) Int. Cl.
*H04L 9/32* (2006.01)
*H04L 9/08* (2006.01)

(52) U.S. Cl.
CPC ............ *H04L 9/3213* (2013.01); *H04L 9/083* (2013.01); *H04L 9/085* (2013.01); *H04L 9/0861* (2013.01)

(58) Field of Classification Search
CPC ..... H04L 9/3213; H04L 9/0861; H04L 9/083; H04L 9/085
See application file for complete search history.

(56) References Cited

U.S. PATENT DOCUMENTS

7,548,890 B2 * 6/2009 Shakkarwar ........... G06Q 20/40
713/186
9,256,869 B2 * 2/2016 Nandagopal ......... G06Q 20/385
(Continued)

FOREIGN PATENT DOCUMENTS

CN 102833076 A 12/2012
CN 103188238 A 7/2013
(Continued)

OTHER PUBLICATIONS

First Search for Chinese Application No. 201811248773.6 dated Jan. 9, 2020.
(Continued)

*Primary Examiner* — J. Brant Murphy (57) ABSTRACT

Disclosed are an identity authentication, number saving and sending, and number binding method, apparatus and device. The identity authentication method comprises: receiving a user identity authentication request sent by a data authentication platform client, wherein the user identity authentication request comprises user authentication information and user identification information, and a data authentication platform server pre-stores the user authentication information and a registration number and a password, which correspond to the user identification information; acquiring, according to the user identification information, the user authentication information pre-stored in the data authentication platform server; matching the user authentication information in the acquired user identity authentication request with the acquired user authentication information pre-stored in the data authentication platform server; when
(Continued)

the matching is successful, receiving a result, sent by the data authentication platform client, of confirming the acquisition of the registration number by a user.

20 Claims, 6 Drawing Sheets

Related U.S. Application Data continuation of application No. PCT/CN2019/102787, filed on Aug. 27, 2019.

(56) References Cited

U.S. PATENT DOCUMENTS

| | | | | |
|---|---|---|---|---|
| 9,596,237 | B2* | 3/2017 | Law | G06Q 20/3821 |
| 9,864,983 | B2* | 1/2018 | Ahn | G06Q 20/322 |
| 10,043,186 | B2* | 8/2018 | Hammad | G06F 21/34 |
| 2002/0029169 | A1* | 3/2002 | Oki | G06Q 20/085 |
| | | | | 705/77 |
| 2005/0097060 | A1* | 5/2005 | Lee | G06Q 20/045 |
| | | | | 705/65 |
| 2006/0015452 | A1* | 1/2006 | Kulasooriya | G06Q 30/06 |
| | | | | 705/39 |
| 2011/0023103 | A1 | 1/2011 | Dietrich et al. | |
| 2011/0302646 | A1* | 12/2011 | Ronda | H04L 9/3268 |
| | | | | 726/9 |
| 2012/0233705 | A1* | 9/2012 | Boysen | G06F 21/77 |
| | | | | 726/29 |
| 2014/0026189 | A1* | 1/2014 | Huang | H04L 63/08 |
| | | | | 726/3 |
| 2015/0127539 | A1 | 5/2015 | Ye et al. | |
| 2015/0254662 | A1* | 9/2015 | Radu | G06Q 20/401 |
| | | | | 705/21 |
| 2015/0269497 | A1* | 9/2015 | Barnett | H04L 63/061 |
| | | | | 705/51 |
| 2016/0042328 | A1* | 2/2016 | Teckchandani | G06Q 20/26 |
| | | | | 705/44 |
| 2016/0048837 | A1* | 2/2016 | Jin | G06Q 20/4014 |
| | | | | 705/76 |
| 2016/0134751 | A1* | 5/2016 | Li | H04M 1/27453 |
| | | | | 455/415 |
| 2016/0253663 | A1* | 9/2016 | Clark | G06Q 20/3678 |
| | | | | 705/75 |
| 2017/0041793 | A1* | 2/2017 | Lee | G06F 21/629 |
| 2017/0068947 | A1* | 3/2017 | Xie | G06Q 20/3278 |
| 2017/0249633 | A1* | 8/2017 | Varadarajan | G06Q 20/40 |
| 2017/0300978 | A1* | 10/2017 | Narasimhan | G06Q 20/3829 |
| 2017/0308896 | A1* | 10/2017 | Wolovitz | G06Q 30/06 |
| 2017/0330188 | A1* | 11/2017 | Canh | G06Q 20/385 |
| 2017/0364911 | A1* | 12/2017 | Landrok | G06Q 20/3825 |
| 2018/0211251 | A1* | 7/2018 | Barnett | H04L 9/14 |
| 2018/0227293 | A1* | 8/2018 | Uhr | G06F 21/64 |
| 2018/0240115 | A1* | 8/2018 | Wong | G06Q 20/4097 |
| 2018/0285980 | A1* | 10/2018 | Hurry | G06Q 10/10 |
| 2020/0134601 | A1* | 4/2020 | Ding | G06Q 20/322 |
| 2020/0186355 | A1* | 6/2020 | Davies | H04L 9/3221 |

FOREIGN PATENT DOCUMENTS

| | | |
|---|---|---|
| CN | 104065639 A | 9/2014 |
| CN | 107423964 A | 12/2017 |
| CN | 107464114 A | 12/2017 |
| CN | 107886320 A | 4/2018 |
| CN | 108701303 A | 10/2018 |
| CN | 109658103 A | 4/2019 |
| JP | 2018-164290 A | 10/2018 |
| TW | 201717078 A | 5/2017 |
| TW | 201812674 A | 4/2018 |
| TW | 201828186 A | 8/2018 |
| WO | 2018/108123 A1 | 6/2018 |

OTHER PUBLICATIONS

Search Report for Taiwanese Application No. 108127214 dated Jun. 4, 2020.
Written Opinion and International Search Report for PCT Application No. PCT/CN2019/102787 dated Nov. 26, 2019.
International Preliminary Report on Patentability Chapter I for PCT Application No. PCT/CN2019/102787 dated May 6, 2021.
Extended European Search Report for European Application No. 19875977.1 dated Nov. 24, 2021.
Seador, "The Beer Drinker's Guide to SAML: Duo Security," Oct. 12, 2017.
Written Opinion for Singapore Patent Application No. 11202100973T dated May 11, 2022.

* cited by examiner

IDENTITY AUTHENTICATION, NUMBER SAVING AND SENDING, AND NUMBER BINDING METHOD, APPARATUS AND DEVICE

CROSS REFERENCE TO RELATED APPLICATION

The present application is a continuation application of the U.S. patent application Ser. No. 17/162,314 filed on Jan. 29, 2021, and titled "IDENTITY AUTHENTICATION, NUMBER SAVING AND SENDING, AND NUMBER BINDING METHOD, APPARATUS AND DEVICE," The U.S. patent application Ser. No. 17/162,314 is a continuation application of the international Patent Application No. PCT/CN2019/102787, filed on Aug. 27, 2019, and titled "IDENTITY AUTHENTICATION, NUMBER SAVING AND SENDING, AND NUMBER BINDING METHOD, APPARATUS AND DEVICE," which claims priority to Chinese Patent Application No. 201811248773.6 filed on Oct. 25, 2018. The entire contents of all of the above applications are incorporated herein by reference in their entirety.

TECHNICAL FIELD

This application relates to the field of Internet financial technologies, and in particular, to an identity authentication, number saving and sending, and number binding method, apparatus and device.

BACKGROUND

With the development and application of Internet financial technologies, more users choose to use quick payment when shopping, which improves payment experience of the users. To implement quick payment, a bank card or a bank account of a user may be bound to an e-wallet or a cashier server of an online merchant in advance. In this way, when paying for goods, the user does not need to log in to an e-bank, and the bank does not need to perform any verification, so that the online payment is extremely simplified and rapid. Generally, when the bank card or the bank account of the user is bound to the e-wallet or the cashier server of the online merchant, the identity of the user needs to be authenticated, to confirm that the operator is a legal holder of the bank card or the bank account.

The identity of the user may be authenticated in various manners. However, currently, in some overseas countries without a central unified ID system and countries where users often change mobile phone numbers without real-name registration, or in other similar scenarios, the manner of identity authentication is limited. For example, in the foregoing scenarios, it may be impossible to use common identity authentication methods such as face recognition and SMS verification code. Using the overseas market scenario as an example, generally, a card number and a validity period of a credit card are saved in an e-wallet or a cashier of an online merchant, and identity authentication is performed by using 3 domain security (3DS). This method can also implement identity authentication and quick payment. However, in such an identity authentication manner, each intermedia link in a payment path, including an order receiving bank, a card association, and a card issuing bank needs to perform computation and charges a fee, which results in a low computing efficiency for the computer system to authenticate users and/or bind their payment accounts with a payment application (e.g., a payment Application installed on a mobile phone), in addition to high costs of the identity authentication manner. Moreover, in security verification based on 3DS, the security verification code of a user may be easily stolen by wrongdoers through fraud or the like, causing the user to lose money. Therefore, the identity authentication manner has low security. In addition, the identity authentication manner involves many intermediate links, it is inconvenient for a user to perform quick payment, and the user may actively give up the payment. Therefore, the identity authentication manner leads to a low payment success rate.

SUMMARY

The embodiments of this application provide an identity authentication, number saving and sending, and number binding method, apparatus and device. Problems of high costs, low security, low payment success rate, and the like caused by the 3DS identity authentication manner in existing technologies are resolved or alleviated.

To resolve the foregoing technical problems, the embodiments of this application are implemented as follows.

An embodiment of this application provides an identity authentication method, including: receiving a user identity authentication request sent by a client of a data authentication platform, where the user identity authentication request includes user authentication information and user identification information, and a server of the data authentication platform pre-stores user authentication information and a registration number and a secret token that correspond to the user identification information; obtaining, according to the user identification information, the user authentication information pre-stored in the server of the data authentication platform; matching the user authentication information in the received user identity authentication request with the obtained user authentication information pre-stored in the server of the data authentication platform; receiving, when the matching succeeds, a confirmation result of the user for obtaining registration number, where the confirmation result is sent by the client of the data authentication platform; obtaining the registration number and the corresponding secret token of the user according to the received confirmation result; and sending the obtained registration number and corresponding secret token of the user to a third-party organization server.

An embodiment of this application provides a number saving and sending method, including: receiving a registration number and a corresponding secret token of a user sent by a server of a data authentication platform; matching the received secret token corresponding to the registration number of the user with pre-stored secret tokens sent by the server of the data authentication platform in batches, where the secret tokens sent in batches are associated with pre-stored user identification information; saving the received registration number of the user when the matching succeeds, where the saved registration number of the user is associated with the pre-stored user identification information of the user; receiving a user number binding request sent by a third-party organization client, where the user number binding request includes user authentication information and user identification information; obtaining, according to the user identification information, user authentication information pre-stored in a third-party organization server; matching the user authentication information in the received user number binding request with the obtained user authentication information pre-stored in the third-party organization server; obtaining the registration number of the user according to the user identification information when the matching succeeds; and sending the obtained registration number of the user to the third-party organization client.

An embodiment of this application provides a number binding method, including: receiving a user number binding request and sending the user number binding request to a third-party organization server, where the user number binding request includes user authentication information and user identification information; receiving, when the third-party organization server succeeds in matching the user authentication information, a registration number of a user sent by the third-party organization server; and obtaining a confirmation result of the user for number binding, where the number binding is successful.

An embodiment of this application provides an identity authentication apparatus, including: a request receiving module, an information obtaining module, an information matching module, a result receiving module, a number and secret token obtaining module, and a number and secret token sending module, where the request receiving module is configured to receive a user identity authentication request sent by a client of a data authentication platform, where the user identity authentication request includes user authentication information and user identification information, and a server of the data authentication platform pre-stores user authentication information and a registration number and a secret token that correspond to the user identification information; the information obtaining module is configured to obtain, according to the user identification information, the user authentication information pre-stored in the server of the data authentication platform; the information matching module is configured to match the user authentication information in the received user identity authentication request with the obtained user authentication information pre-stored in the server of the data authentication platform; the result receiving module is configured to receive, when the matching succeeds, a confirmation result of the user for obtaining registration number, where the confirmation result is sent by the client of the data authentication platform; the number and secret token obtaining module is configured to obtain the registration number and the corresponding secret token of the user according to the received confirmation result; and the number and secret token sending module is configured to send the obtained registration number and corresponding secret token of the user to a third-party organization server.

An embodiment of this application provides a number saving and sending apparatus, including: a number and secret token receiving module, a secret token matching module, a number saving module, a request receiving module, an information obtaining module, an information matching module, a number obtaining module, and a number sending module, where the number and secret token receiving module is configured to receive a registration number and a corresponding secret token of a user sent by a server of a data authentication platform; the secret token matching module is configured to match the received secret token corresponding to the registration number of the user with pre-stored secret tokens sent by the server of the data authentication platform in batches, where the secret tokens sent in batches are associated with pre-stored user identification information; the number saving module is configured to save the received registration number of the user when the matching succeeds, where the saved registration number of the user is associated with the pre-stored user identification information of the user; the request receiving module is configured to receive a user number binding request sent by a third-party organization client, where the user number binding request includes user authentication information and user identification information; the information obtaining module is configured to obtain, according to the user identification information, user authentication information pre-stored in a third-party organization server; the information matching module is configured to match the user authentication information in the received user number binding request with the obtained user authentication information pre-stored in the third-party organization server; the number obtaining module is configured to obtain the registration number of the user according to the user identification information when the matching succeeds; and the number sending module is configured to send the obtained registration number of the user to the third-party organization client.

An embodiment of this application provides a number binding apparatus, including: a request receiving module, a request sending module, a number receiving module, and a result receiving module, where the request receiving module is configured to receive a user number binding request; the request sending module is configured to send the user number binding request to a third-party organization server, where the user number binding request includes user authentication information and user identification information; the number receiving module is configured to receive, when the third-party organization server succeeds in matching the user authentication information, a registration number of a user sent by the third-party organization server; and the result receiving module is configured to receive a confirmation result of the user for number binding, where the number binding is successful.

An embodiment of this application provides an identity authentication device, including a memory and a processor, where the memory stores a program, and the program is configured to cause the processor to perform the identity authentication method.

An embodiment of this application provides a number saving and sending device, including a memory and a processor, where the memory stores a program, and the program is configured to cause the processor to perform the number saving and sending method.

An embodiment of this application provides a number binding device, including a memory and a processor, where the memory stores a program, and the program is configured to cause the processor to perform the number binding method.

An embodiment of this application provides a system for identity authentication, number saving and sending, and number binding, including an identity authentication apparatus, a number saving and sending apparatus, and a number binding apparatus.

In some embodiments, a computer-implemented authentication method for identity authentication and registration number binding comprises: receiving, by one or more servers of a data authentication platform, a user identity authentication request of a user sent by a client of the data authentication platform, wherein the user identity authentication request comprises (i) first user authentication information and (ii) user identification information, and the one or more servers of the data authentication platform pre-store (i) second user authentication information and (ii) a registration number and a secret token that correspond to the user identification information; obtaining, by the one or more servers according to the user identification information, the second user authentication information pre-stored in the one or more servers of the data authentication platform; matching, by the one or more servers, the first user authentication information in the received user identity authentication request with the obtained second user authentication information pre-stored in the server of the data authentication platform; when the matching succeeds and when receiving, by the one or more servers from the client of the data authentication platform, a request for obtaining registration number, obtaining, by the one or more servers, the registration number and the corresponding secret token of the user according to the received confirmation result; and sending, by the one or more servers, the obtained registration number and corresponding secret token of the user to a third-party organization server.

In some embodiments, the method further comprises: receiving, by the third-party organization server, the registration number and the corresponding secret token of the user from the one or more servers of the data authentication platform; matching, by the third-party organization server, the received secret token corresponding to the registration number of the user with pre-stored secret tokens sent by the one or more servers of the data authentication platform; when the matching between the received secret token and the pre-stored secret tokens succeeds, saving, by the third-party organization server, the received registration number of the user in association with pre-stored user identification information of the user in the third-party organization server; receiving, by the third-party organization server, a user number binding request from a third-party organization client, wherein the user number binding request comprises (i) the first user authentication information and (ii) the user identification information; obtaining, by the third-party organization server according to the user identification information, third user authentication information pre-stored in the third-party organization server; matching, by the third-party organization server, the first user authentication information in the received user number binding request with the obtained third user authentication information pre-stored in the third-party organization server; when the matching between the first user authentication information and the third user authentication information succeeds, obtaining, by the third-party organization server, the saved registration number of the user according to the user identification information in the received user number binding request; and sending, by the third-party organization server, the obtained saved registration number of the user to the third-party organization client.

In some embodiments, the method further comprises: receiving, by the third-party organization client, the registration number of the user from the third-party organization server; and receiving, by the third-party organization client, a confirmation by the user for binding the registration number.

In some embodiments, the registration number corresponds to a payment account, and the method further comprises: receiving, by the third-party organization server from the third-party organization client, a confirmation of the registration number of the user sent from the third-party organization server, wherein the confirmation indicates a success in binding the payment account with a payment application maintained by the third-party organization server and accessible from the third-party organization client.

In some embodiments, one or more non-transitory computer-readable storage media storing instructions executable by one or more processors, wherein execution of the instructions causes the one or more processors to perform operations comprising: receiving a user identity authentication request of a user sent by a client of a data authentication platform, wherein the user identity authentication request comprises (i) first user authentication information and (ii) user identification information, and one or more servers of the data authentication platform pre-store (i) second user authentication information and (ii) a registration number and a secret token that correspond to the user identification information; obtaining, according to the user identification information, the second user authentication information pre-stored in the one or more servers of the data authentication platform; matching the first user authentication information in the received user identity authentication request with the obtained second user authentication information pre-stored in the server of the data authentication platform; when the matching succeeds and when receiving, from the client of the data authentication platform, a request for obtaining registration number, obtaining the registration number and the corresponding secret token of the user according to the received confirmation result; and sending the obtained registration number and corresponding secret token of the user to a third-party organization server.

In some embodiments, the operations further comprise: receiving the registration number and the corresponding secret token of the user from the one or more servers of the data authentication platform; matching the received secret token corresponding to the registration number of the user with pre-stored secret tokens sent by the one or more servers of the data authentication platform; when the matching between the received secret token and the pre- stored secret tokens succeeds, saving the received registration number of the user in association with pre-stored user identification information of the user in the third-party organization server; receiving a user number binding request from a third-party organization client, wherein the user number binding request comprises (i) the first user authentication information and (ii) the user identification information; obtaining, according to the user identification information, third user authentication information pre-stored in the third-party organization server; matching the first user authentication information in the received user number binding request with the obtained third user authentication information pre-stored in the third-party organization server; when the matching between the first user authentication information and the third user authentication information succeeds, obtaining the saved registration number of the user according to the user identification information in the received user number binding request; and sending the obtained saved registration number of the user to the third-party organization client.

A system comprising one or more processors and one or more non-transitory computer-readable memories coupled to the one or more processors and configured with instructions executable by the one or more processors to cause the system to perform operations comprising: receiving a user identity authentication request of a user sent by a client of a data authentication platform, wherein the user identity authentication request comprises (i) first user authentication information and (ii) user identification information, and one or more servers of the data authentication platform pre-store (i) second user authentication information and (ii) a registration number and a secret token that correspond to the user identification information; obtaining, according to the user identification information, the second user authentication information pre-stored in the one or more servers of the data authentication platform; matching the first user authentication information in the received user identity authentication request with the obtained second user authentication information pre-stored in the server of the data authentication platform; when the matching succeeds and when receiving, from the client of the data authentication platform, a request for obtaining registration number, obtaining the registration number and the corresponding secret token of the user according to the received confirmation result; and sending the obtained registration number and corresponding secret token of the user to a third-party organization server.

At least one of the foregoing technical solutions used in the embodiments of this application can achieve the following beneficial effects: a data authentication platform is directly connected to a third-party organization, without joining in a 3DS system of a card association. Thus, the overall computing efficiency for the system to authenticate users and/or bind their payment accounts with a payment application (e.g., a payment Application installed on a mobile phone) is improved, because many intermediate transaction links are obviated. In addition, no fee is charged in intermediate transaction links, and transaction costs are low. The disclosed systems and methods involve fewer intermediate transaction links, resulting in a short transaction path and achieving high security and payment success rate, thereby realizing identity authentication for quick card binding in a country without a central unified ID system.

BRIEF DESCRIPTION OF THE DRAWINGS

To describe the technical solutions in the embodiments of this application or in existing technologies more clearly, the following briefly introduces the accompanying drawings required for describing the embodiments or the prior art. Apparently, the accompanying drawings in the following description show merely some embodiments of this application, and a person of ordinary skill in the art may still derive other drawings from these accompanying drawings without creative efforts.

DETAILED DESCRIPTION

The embodiments of this application provide an identity authentication, number saving and sending, and number binding method, apparatus and device.

To enable a person skilled in the art to better understand the technical solutions in this application, the technical solutions of the embodiments of this application will be described clearly and thoroughly below with reference to the accompanying drawings of the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In some overseas countries without a central unified ID system and countries where users often change mobile phone numbers without real-name registration, it is impossible to use identity authentication methods that are commonly used at home, such as face recognition and SMS verification code. To address the foregoing difficulty in identity authentication and card binding, bank channels with a credible identity authentication capability, such as bank branches, ATMs, e-banks, and mobile banking are fully used, to replace the card binding operation in a third-party organization with an activation operation in a bank channel with a credible identity authentication capability.

In the following embodiments of this application, for example, a data authentication platform is a quick payment partner bank, a third-party organization is Alipay, and a registration number is a bank card number and/or a bank account.

In some embodiments, an example of a method performed by one or more computing devices (e.g., one or more servers at the side of the quick payment partner bank) is described with reference to FIG. 1.

Figure 1:
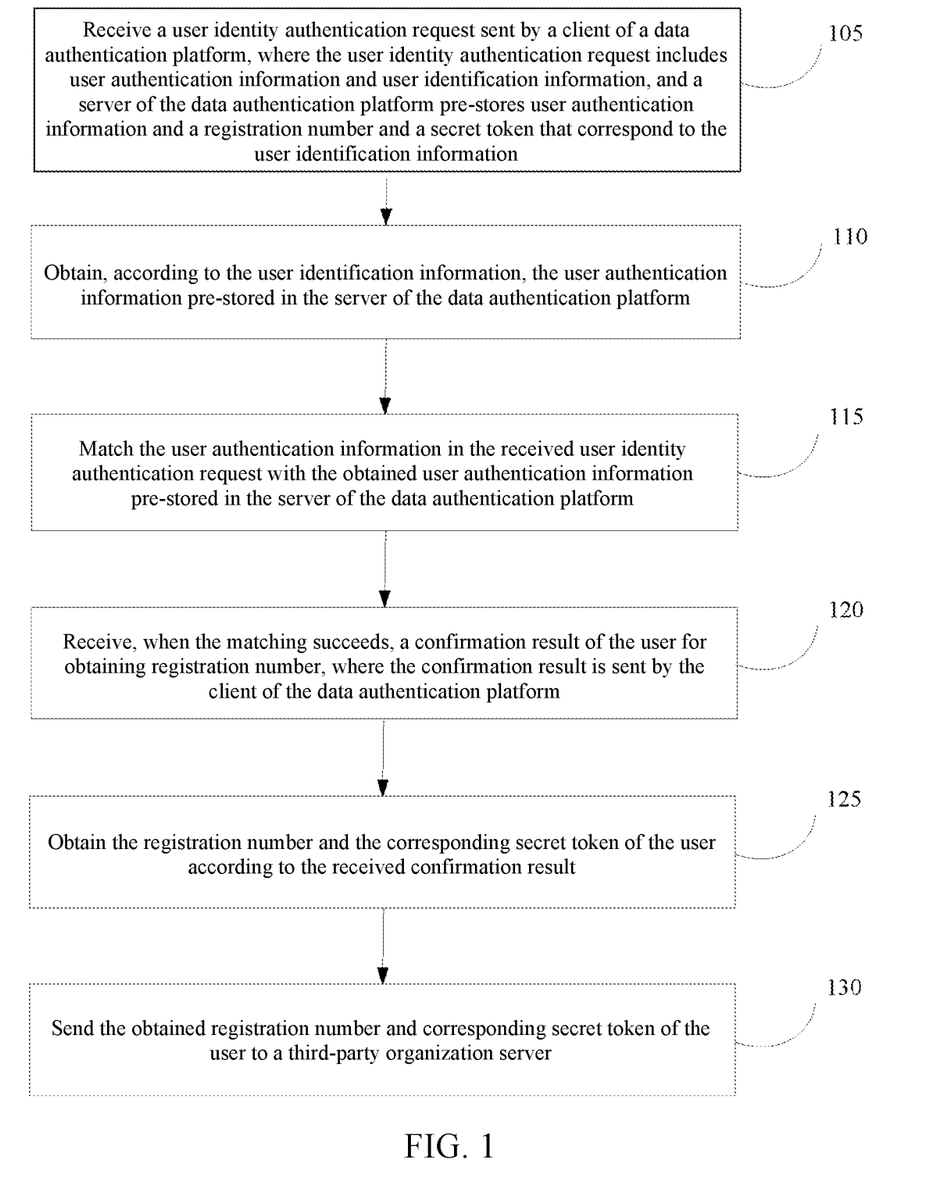
FIG. 1 is a schematic flowchart of an identity authentication method, according to an embodiment of this application.

FIG. 1 is a schematic flowchart of an identity authentication method, according to an embodiment of this application. The schematic flowchart includes the following steps.

Step 105. Receiving a user identity authentication request sent by a client of a data authentication platform, where the user identity authentication request includes user authentication information and user identification information, and a server of the data authentication platform pre-stores user authentication information and a registration number and a secret token that correspond to the user identification information.

In some embodiments, a user is a customer of the quick payment partner bank and is also a customer of the third-party organization.

In some embodiments, for example, identity authentication is performed by using mobile banking of China Merchants Bank. A user Zhang San logs in to the mobile banking of China Merchants Bank and initiates an identity authentication request. The identity authentication request includes user authentication information and user identification information of Zhang San for logging in to the mobile banking, the user identification information includes an ID number, a mobile phone number, and a bank card number or a bank account, and the user authentication information includes a password and/or a verification code.

In some embodiments, after obtaining the user authentication information and the user identification information, a mobile banking client of China Merchants Bank sends the user authentication information and the user identification information to a server of China Merchants Bank.

As an optional implementation, in some embodiments, the user Zhang San is a pre-registered user before the client of the data authentication platform initiates the user identity authentication request. To improve the number of users binding cards by using the identity authentication method in the technical solution, the bank sends a red envelope (e.g., a monetary gift provided through a computer network) to pre-registered users. In some embodiments, before step 105 is performed, the quick payment partner bank generates irreversible unique secret tokens by using one or more bank card numbers and/or bank accounts of one or more pre-registered users, and sends the generated secret tokens to an Alipay server in batches. In some embodiments, for example, China Merchants Bank generates irreversible unique secret tokens by using bank card numbers 6225999878762456 and 6225999878762457 of Zhang San and bank card numbers 6224890999097890 of Li Si, and sends the generated secret tokens to the Alipay server. The secret token is invisible to the outside, and neither the user nor others can obtain the content of the secret token. The secret token is encrypted and transmitted to the Alipay server through a private security network connection (VPN or a private line).

Step 110. Obtaining, according to the user identification information, the user authentication information pre-stored in the server of the data authentication platform.

In some embodiments, the user authentication information of Zhang San, such as the password and/or the verification code, pre-stored in the server of China Merchants Bank is obtained according to the user identification information of Zhang San obtained in step 105.

As an optional implementation, in some embodiments, the quick payment partner bank allocates a unique identification (ID) corresponding to the user identification information to each customer in advance, and each ID is associated with a plurality of bank card numbers and/or bank accounts of the customer and corresponding secret tokens. ID of Zhang San on the server side of China Merchants Bank is 00000000, and bank card numbers of Zhang San in China Merchants Bank are 6225999878762456 and 6225999878762457. The ID is associated with the bank card numbers and corresponding secret tokens. After step 105, the user authentication information pre-stored in the server of the data authentication platform is obtained according to the unique ID.

Step 115. Matching the user authentication information in the received user identity authentication request with the obtained user authentication information pre-stored in the server of the data authentication platform.

In some embodiments, the password and/or the verification code obtained in step 105 are/is matched with the user authentication information of Zhang San obtained from the server of China Merchants Bank according to the user identification information of Zhang San in step 110.

Step 120. Receiving, when the matching succeeds, a confirmation result of the user for obtaining registration number, where the confirmation result is sent by the client of the data authentication platform.

In some embodiments, when the matching operation in step 115 succeeds and the user clicks a button "Registration number," the server of the data authentication platform obtains a result of clicking the button "Registration number" by the user.

Step 125. Obtaining the registration number and the corresponding secret token of the user according to the received confirmation result.

As an optional implementation, each registration number and each corresponding secret token of the user are obtained; alternatively, each obtained registration number of the user is sent to the client of the data authentication platform, and a registration number selected by the user and a secret token corresponding to the registration number selected by the user are obtained. In some embodiments, for example, each registration number and each corresponding secret token of the user are obtained.

Step 130. Sending the obtained registration number and corresponding secret token of the user to a third-party organization server.

In some embodiments, the quick payment partner bank automatically sends, to the third-party organization server, a bank card number and a corresponding secret token and/or a bank account and a corresponding secret token of a pre-registered user that need to be saved in the third-party organization server. Further, in some embodiments, the bank card number 6225999878762456 and the corresponding secret token and the bank card number 6225999878762457 and the corresponding secret token of Zhang San are sent to the Alipay server.

Compared with existing technologies, the foregoing technical solution used in the embodiments of this application can achieve the following beneficial effects: a bank is directly connected to Alipay, without joining in a 3DS system of a card association; no fee is charged in intermediate transaction links, and transaction costs are low; this application involves few intermediate transaction links, has a short transaction path, and achieves high security and payment success rate, thereby realizing identity authentication for quick card binding in a country without a central unified ID system. A pre-registered user may receive a red envelope; both the bank and Alipay may make full use of respective channel advantages to promote the quick payment and acquire customers, thereby ensuring a high customer conversion rate and card binding success rate.

In some embodiments, an example of a method performed by one or more computing devices (e.g., one or more servers at the side of the third-party organization) is described with reference to FIG. 2.

Figure 2:
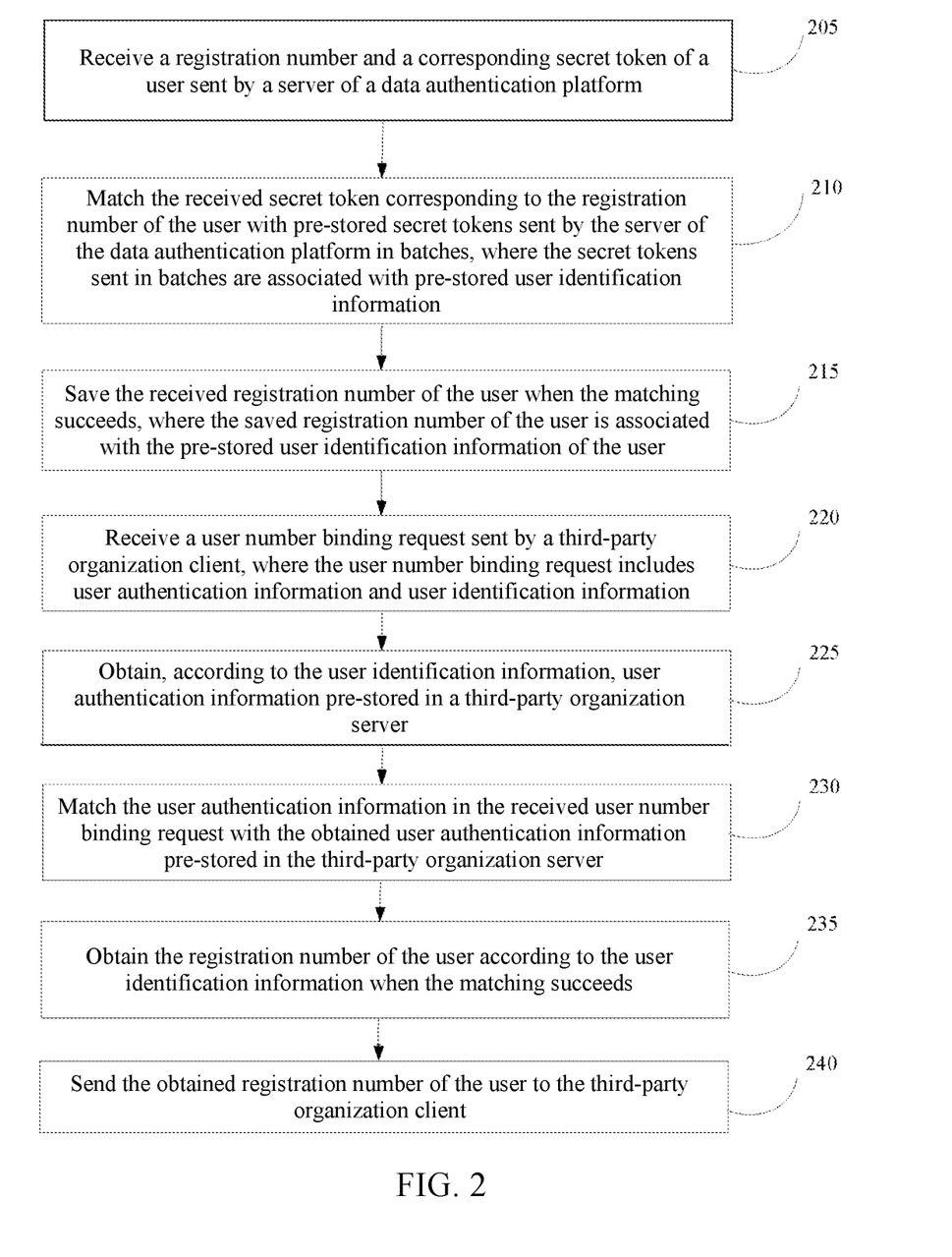
FIG. 2 is a schematic flowchart of a number saving and sending method, according to an embodiment of this application.

FIG. 2 is a schematic flowchart of a number saving and sending method, according to an embodiment of this application. The schematic flowchart includes the following steps.

Step 205. Receiving a registration number and a corresponding secret token of a user sent by a server of a data authentication platform.

In some embodiments, the server of China Merchants Bank receives the bank card numbers 6225999878762456 and 6225999878762457 of Zhang San and also receives secret tokens corresponding to the two bank card numbers of Zhang San.

As an optional implementation, before step 205, the server of China Merchants Bank receives secret tokens respectively generated by the server of the data authentication platform according to one or more registration numbers of the one or more users. In some embodiments, secret tokens respectively generated by using the bank card numbers 6225999878762456 and 6225999878762457 of Zhang San and a secret token generated by using a bank card number 6224890999097890 of Li Si are received.

Step 210. Matching the received secret token corresponding to the registration number of the user with pre-stored secret tokens sent by the server of the data authentication platform in batches, where the secret tokens sent in batches are associated with pre-stored user identification information.

In some embodiments, the secret token corresponding to the bank card number 6225999878762456 of Zhang San and the secret token corresponding to the bank card number 6225999878762457 of Zhang San that are received in step 205 are matched with secret tokens that are pre-stored in the Alipay server and that are sent by the server of the data authentication platform in batches.

Step 215. Saving the received registration number of the user when the matching succeeds, where the saved registration number of the user is associated with the pre-stored user identification information of the user.

In some embodiments, when the matching operation in step 210 succeeds, the received bank card numbers 6225999878762456 and 6225999878762457 of Zhang San are saved into the user identification information of Zhang San.

Step 220. Receiving a user number binding request sent by a third-party organization client, where the user number binding request includes user authentication information and user identification information.

In some embodiments, Zhang San logs in to the Alipay client and initiates a number binding request. The number binding request includes user authentication information and user identification information of Zhang San for logging in to the Alipay client, the user identification information includes a mobile phone number or an ID number, and the user authentication information includes a password and/or a verification code.

Step 225. Obtaining, according to the user identification information, user authentication information pre-stored in a third-party organization server.

In some embodiments, user authentication information registered by Zhang San in the Alipay server is obtained according to the obtained user identification information, such as a mobile phone number or an ID number, of Zhang San for logging in to the Alipay client.

As an optional implementation, in some embodiments, the Alipay server pre-stores a unique ID corresponding to the user identification information of Zhang San, and the user authentication information of Zhang San pre-stored in the Alipay server is obtained according to the unique ID.

Step 230. Matching the user authentication information in the received user number binding request with the obtained user authentication information pre-stored in the third-party organization server.

In some embodiments, the mobile phone number or the ID number and the password and/or the verification code in the number binding request received in step 220 are matched with the obtained mobile phone number or the ID number and the password and/or the verification code of Zhang San pre-stored in the Alipay server.

Step 235. Obtaining the registration number of the user according to the user identification information when the matching succeeds.

In some embodiments, when matching of the user authentication information succeeds, the bank card numbers 6225999878762456 and 6225999878762457 of Zhang San are obtained according to the user identification information such as the mobile phone number or the ID number of Zhang San.

As an optional implementation, in some embodiments, the ID of Zhang San in the Alipay server is 000000. The bank card numbers 6225999878762456 and 6225999878762457 of Zhang San are obtained according to the ID of Zhang San.

Step 240. Sending the obtained registration number of the user to the third-party organization client.

In some embodiments, the bank card numbers 6225999878762456 and 6225999878762457 of Zhang San obtained in step 235 are sent to the Alipay client.

In some embodiments, an example of a method performed by one or more computing devices (e.g., one or more clients at the side of the third-party organization) is described with reference to FIG. 3.

Figure 3:
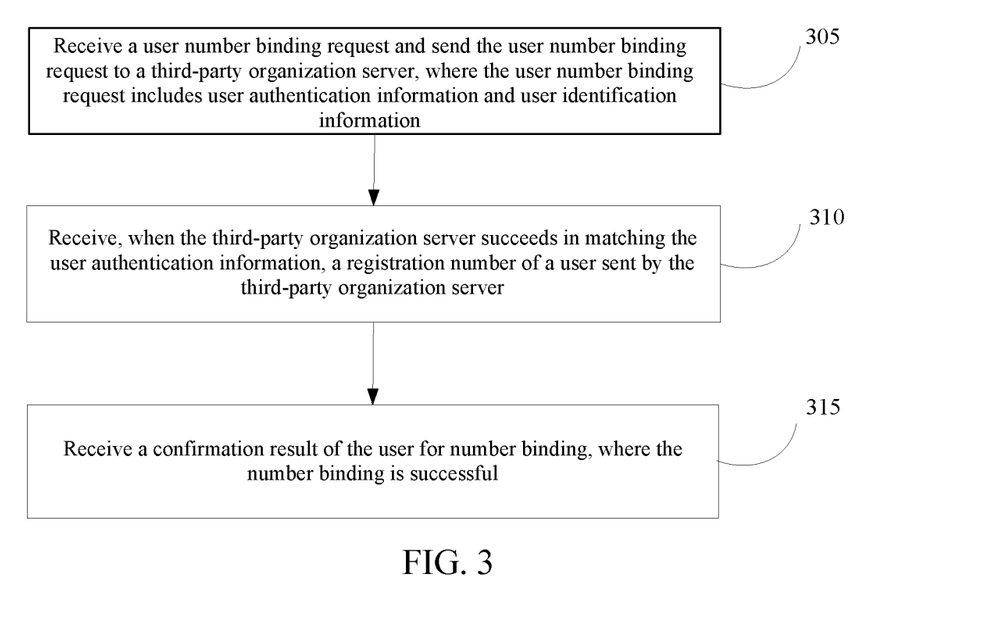
FIG. 3 is a schematic flowchart of a number binding method, according to an embodiment of this application.

FIG. 3 is a schematic flowchart of a number binding method, according to an embodiment of this application. The schematic flowchart includes the following steps.

Step 305. Receiving a user number binding request and sending the user number binding request to a third-party organization server, where the user number binding request includes user authentication information and user identification information.

In some embodiments, a user initiates a number binding request in the Alipay client. The number binding request includes user authentication information and user identification information, the user identification information includes a mobile phone number or an ID number, and the user authentication information includes a password and/or a verification code. The Alipay client sends the user authentication information and the user identification information to the Alipay server.

Step 310. Receiving, when the third-party organization server succeeds in matching the user authentication information, a registration number of a user sent by the third-party organization server.

As an optional implementation, a registration number selected by the user and sent by the third-party organization server is received; or each registration number of the user sent by the third-party organization server is received and a registration number selected by the user is obtained.

In some embodiments, when the Alipay server succeeds in matching the user authentication information, the bank card numbers 6225999878762456 and 6225999878762457 of Zhang San sent by the Alipay server are received. The bank card numbers 6225999878762456 and 6225999878762457 are displayed on an interface of the Alipay client.

As an optional implementation, in some embodiments, when Zhang San selects the bank card number 6225999878762456, the Alipay client receives a result that the Zhang San selects the bank card number 6225999878762456.

Step 315. Receiving a confirmation result of the user for number binding, where the number binding is successful.

In some embodiments, when Zhang San clicks the button "Bind the number," the Alipay client receives a result of clicking the button "Bind the number" by Zhang San, and the number is bound successfully.

As an optional implementation, when Zhang San clicks the button "Do not bind the number," the Alipay client receives a result of clicking the button "Do not bind the number" by Zhang San, and the number binding fails.

Figure 4:
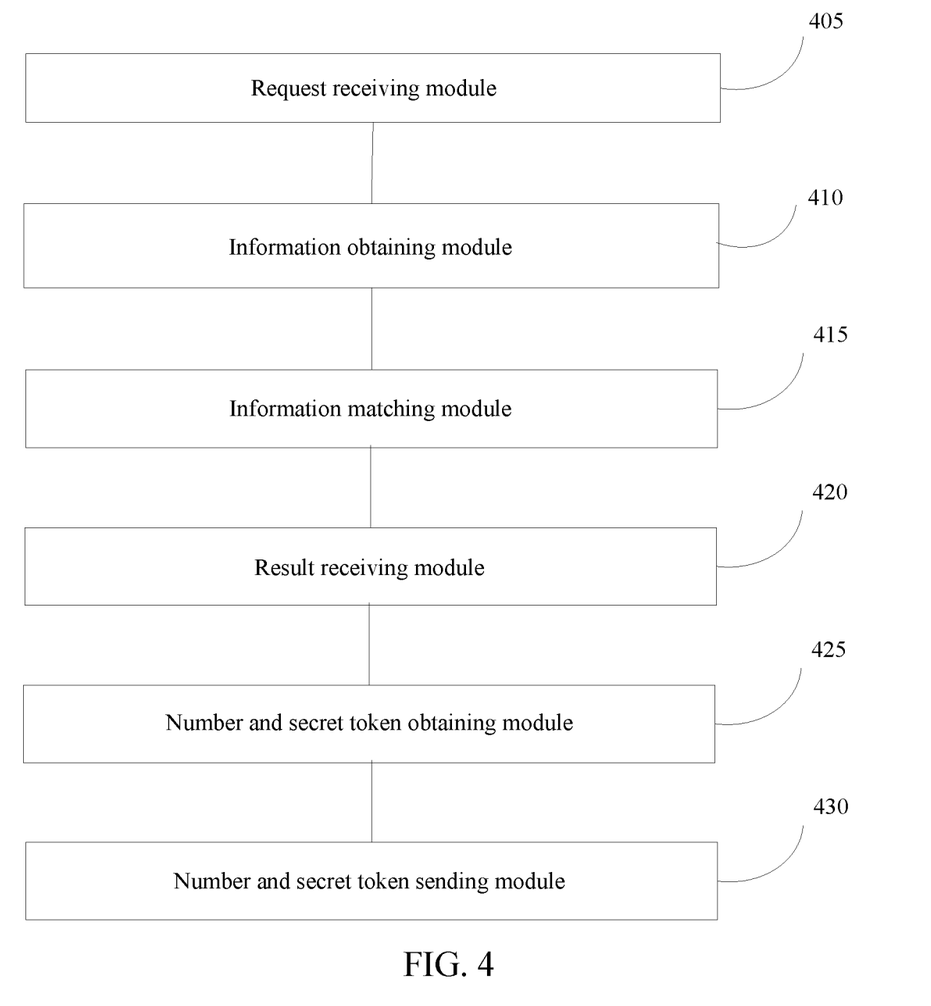
FIG. 4 is a schematic structural diagram of an identity authentication apparatus, according to an embodiment of this application.

FIG. 4 is a schematic structural diagram of an identity authentication apparatus, according to an embodiment of this application. The schematic structural diagram includes: a request receiving module 405, an information obtaining module 410, an information matching module 415, a result receiving module 420, a number and secret token obtaining module 425, and a number and secret token sending module 430.

The request receiving module 405 is configured to receive a user identity authentication request sent by a client of a data authentication platform, where the user identity authentication request includes user authentication information and user identification information, and a server of the data authentication platform pre-stores user authentication information and a registration number and a secret token that correspond to the user identification information.

The information obtaining module 410 is configured to obtain, according to the user identification information, the user authentication information pre-stored in the server of the data authentication platform.

The information matching module 415 is configured to match the user authentication information in the received user identity authentication request with the obtained user authentication information pre-stored in the server of the data authentication platform.

The result receiving module 420 is configured to receive, when the matching succeeds, a confirmation result of the user for obtaining registration number, where the confirmation result is sent by the client of the data authentication platform.

The number and secret token obtaining module 425 is configured to obtain the registration number and the corresponding secret token of the user according to the received confirmation result.

The number and secret token sending module 430 is configured to send the obtained registration number and corresponding secret token of the user to a third-party organization server.

Optionally, the number and secret token obtaining module is configured to obtain each registration number and each corresponding secret token of the user; or send each obtained registration number of the user to the client of the data authentication platform and obtain a registration number selected by the user and a secret token corresponding to the registration number selected by the user.

Optionally, the user is a pre-registered user; the apparatus further includes a secret token generation module and a secret token sending module; before the request receiving module receives the user identity authentication request sent by the client of the data authentication platform, the secret token generation module is configured to respectively generate irreversible unique secret tokens by using one or more registration numbers of one or more pre-registered users.

The secret token sending module is configured to send the generated secret tokens to the third-party organization server in batches.

Optionally, the server of the data authentication platform pre-stores a unique ID corresponding to the user identification information, and after the request receiving module receives the user identity authentication request sent by the client of the data authentication platform, the information obtaining module is further configured to obtain, according to the unique ID, the user authentication information pre-stored in the server of the data authentication platform.

In some embodiments, the various modules of the identity authentication apparatus in FIG. 4 may be implemented as software instructions or a combination of software and hardware. For example, the identity authentication apparatus (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the identity authentication apparatus may include a server, a mobile phone, a tablet computer, a PC, a laptop computer, or a combination of one or more of these computing devices.

Figure 5:
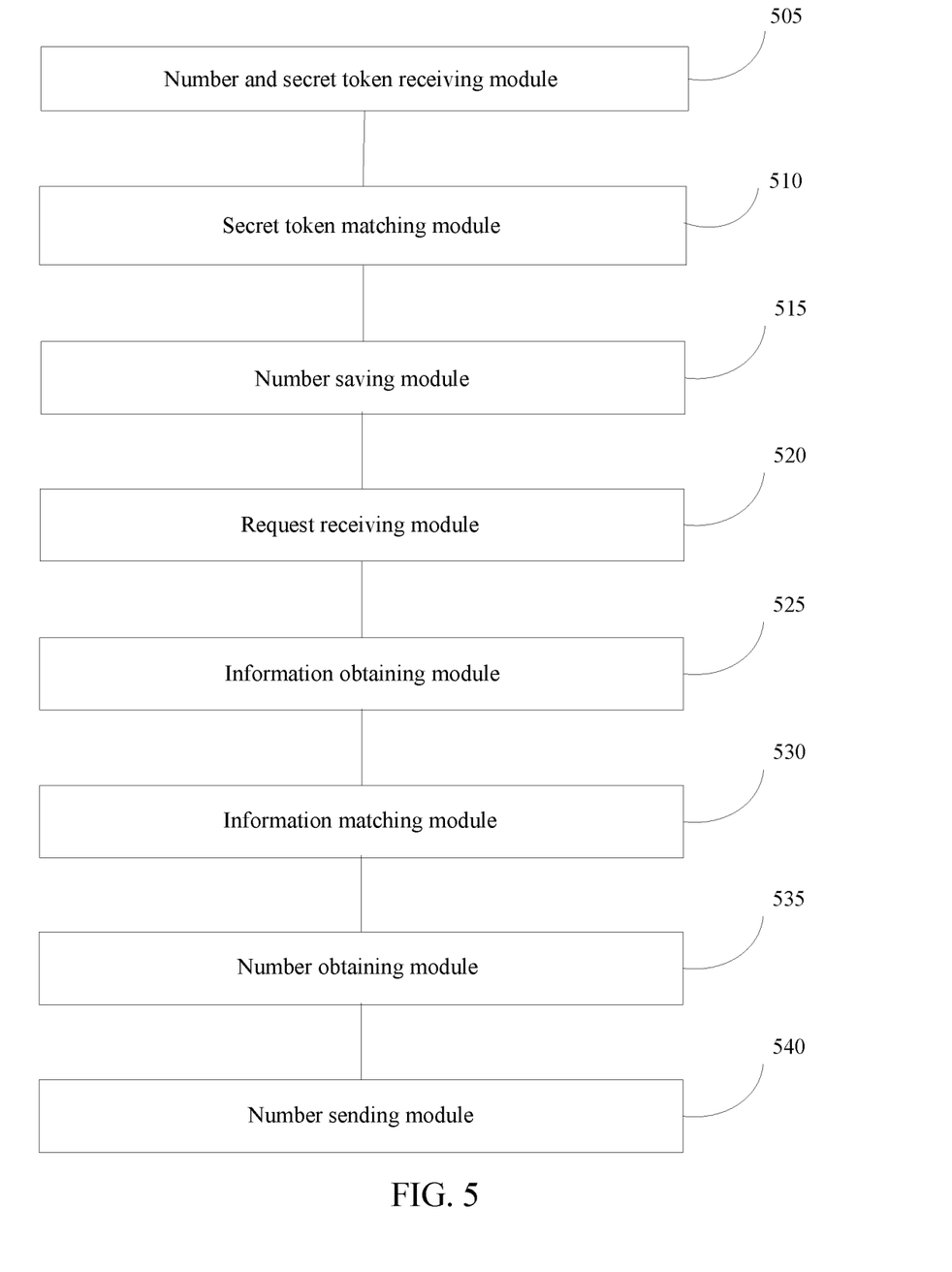
FIG. 5 is a schematic structural diagram of a number saving and sending apparatus, according to an embodiment of this application.

FIG. 5 is a schematic structural diagram of a number saving and sending apparatus, according to an embodiment of this application. The schematic structural diagram includes: a number and secret token receiving module 505, a secret token matching module 510, a number saving module 515, a request receiving module 520, an information obtaining module 525, an information matching module 530, a number obtaining module 535, and a number sending module 540.

The number and secret token receiving module 505 is configured to receive a registration number and a corresponding secret token of a user sent by a server of a data authentication platform.

The secret token matching module 510 is configured to match the received secret token corresponding to the registration number of the user with pre-stored secret tokens sent by the server of the data authentication platform in batches, where the secret tokens sent in batches are associated with pre-stored user identification information.

The number saving module 515 is configured to save the received registration number of the user when the matching succeeds, where the saved registration number of the user is associated with the pre-stored user identification information of the user.

The request receiving module 520 is configured to receive a user number binding request sent by a third-party organization client, where the user number binding request includes user authentication information and user identification information.

The information obtaining module 525 is configured to obtain, according to the user identification information, user authentication information pre-stored in a third-party organization server.

The information matching module 530 is configured to match the user authentication information in the received user number binding request with the obtained user authentication information pre-stored in the third-party organization server.

The number obtaining module 535 is configured to obtain the registration number of the user according to the user identification information when the matching succeeds.

The number sending module 540 is configured to send the obtained registration number of the user to the third-party organization client.

Optionally, the third-party organization server pre-stores a unique ID corresponding to the user identification information.

After the request receiving module receives the user number binding request sent by the third-party organization client, the information obtaining module 525 is further configured to obtain, according to the unique ID, the user authentication information pre-stored in the third-party organization server.

Optionally, before receiving the registration number and the corresponding secret token of the user sent by the server of the data authentication platform, the number and secret token receiving module 505 is further configured to receive secret tokens respectively generated by the server of the data authentication platform according to one or more registration numbers of one or more users.

In some embodiments, the various modules of the number saving and sending apparatus in FIG. 5 may be implemented as software instructions or a combination of software and hardware. For example, the number saving and sending apparatus (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the number saving and sending apparatus may include a server, a mobile phone, a tablet computer, a PC, a laptop computer, or a combination of one or more of these computing devices.

Figure 6:
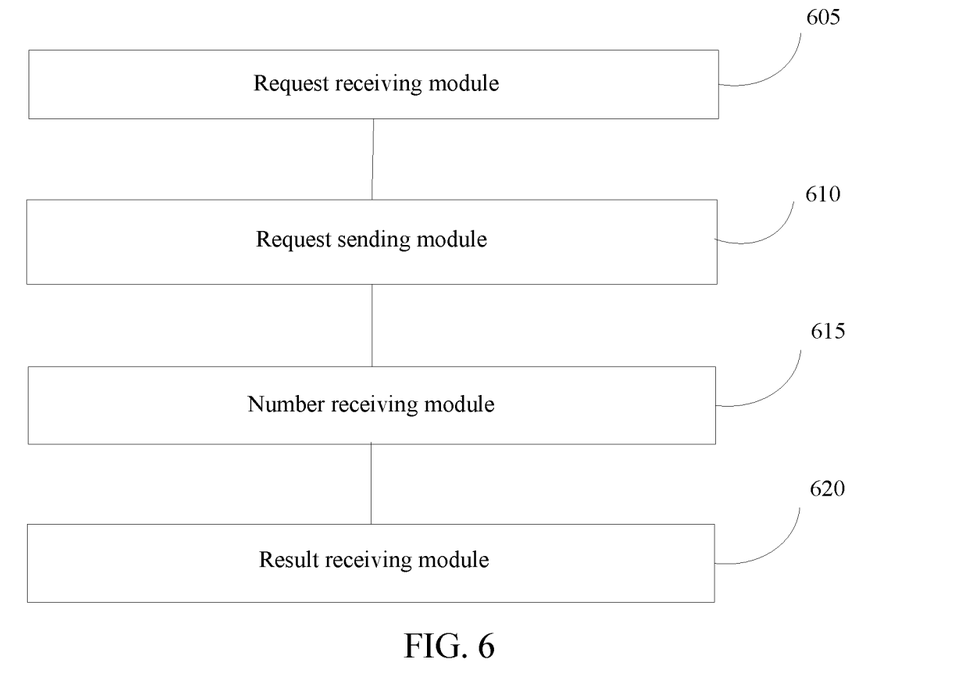
FIG. 6 is a schematic structural diagram of a number binding apparatus, according to an embodiment of this application.

FIG. 6 is a schematic structural diagram of a number binding apparatus, according to an embodiment of this application. The schematic structural diagram includes: a request receiving module 605, a request sending module 610, a number receiving module 615, and a result receiving module 620.

The request receiving module 605 is configured to receive a user number binding request.

The request sending module 610 is configured to send the user number binding request to a third-party organization server, where the user number binding request includes user authentication information and user identification information.

The number receiving module 615 is configured to receive, when the third-party organization server succeeds in matching the user authentication information, a registration number of a user sent by the third-party organization server.

The result receiving module 620 is configured to receive a confirmation result of the user for number binding, where the number binding is successful.

Optionally, the number receiving module 615 is configured to receive a registration number selected by the user and sent by the third-party organization server; or receive each registration number of the user sent by the third-party organization server and obtain a registration number selected by the user.

Optionally, the apparatus further includes a result confirming module, configured to: after the number receiving module receives the registration number of the user sent by the third-party organization server, receive a confirmation result of the user for stopping number binding, the number binding being unsuccessful.

The embodiments of this application provide an identity authentication device, including a memory and a processor, where the memory stores a program, and the program is configured to cause the processor to receive a user identity authentication request sent by a client of a data authentication platform, where the user identity authentication request includes user authentication information and user identification information, and a server of the data authentication platform pre-stores user authentication information and a registration number and a secret token that correspond to the user identification information; obtain, according to the user identification information, the user authentication information pre-stored in the server of the data authentication platform; match the user authentication information in the obtained user identity authentication request with the obtained user authentication information pre-stored in the server of the data authentication platform; receive, when the matching succeeds, a confirmation result of the user for obtaining registration number, where the confirmation result is sent by the client of the data authentication platform; obtain the registration number and the corresponding secret token of the user according to the received confirmation result; and send the obtained registration number and corresponding secret token of the user to a third-party organization server.

The embodiments of this application provide a number saving and sending device, including a memory and a processor, where the memory stores a program, and the program is configured to cause the processor to receive a registration number and a corresponding secret token of a user sent by a server of a data authentication platform; match the received secret token corresponding to the registration number of the user with pre-stored secret tokens sent by the server of the data authentication platform in batches, where the secret tokens sent in batches are associated with pre-stored user identification information; save the received registration number of the user when the matching succeeds, where the saved registration number of the user is associated with the pre-stored user identification information of the user; receive a user number binding request sent by a third-party organization client, where the user number binding request includes user authentication information and user identification information; obtain, according to the user identification information, user authentication information pre-stored in a third-party organization server; match the user authentication information in the received user number binding request with the obtained user authentication information pre-stored in the third-party organization server; obtain the registration number of the user according to the user identification information when the matching succeeds; and send the obtained registration number of the user to the third-party organization client.

The embodiments of this application provide a number binding device, including a memory and a processor, where the memory stores a program, and the program is configured to cause the processor to receive a user number binding request and send the user number binding request to a third-party organization server, where the user number binding request includes user authentication information and user identification information; receive, when the third-party organization server succeeds in matching the user authentication information, a registration number of a user sent by the third-party organization server; and receive a confirmation result of the user for number binding, where the number binding is successful.

In some embodiments, the various modules of the number binding apparatus in FIG. 6 may be implemented as software instructions or a combination of software and hardware. For example, the number binding apparatus (or referred to as a system) may comprise one or more processors (e.g., CPU) and one or more non-transitory computer-readable storage memories coupled to the one or more processors and configured with instructions executable by the one or more processors to cause one or more components (e.g., the one or more processors) of the system to perform various steps and methods of the modules described above (e.g., with reference to the method embodiments). In some embodiments, the number binding apparatus may include a server, a mobile phone, a tablet computer, a PC, a laptop computer, or a combination of one or more of these computing devices.

Figure 7:
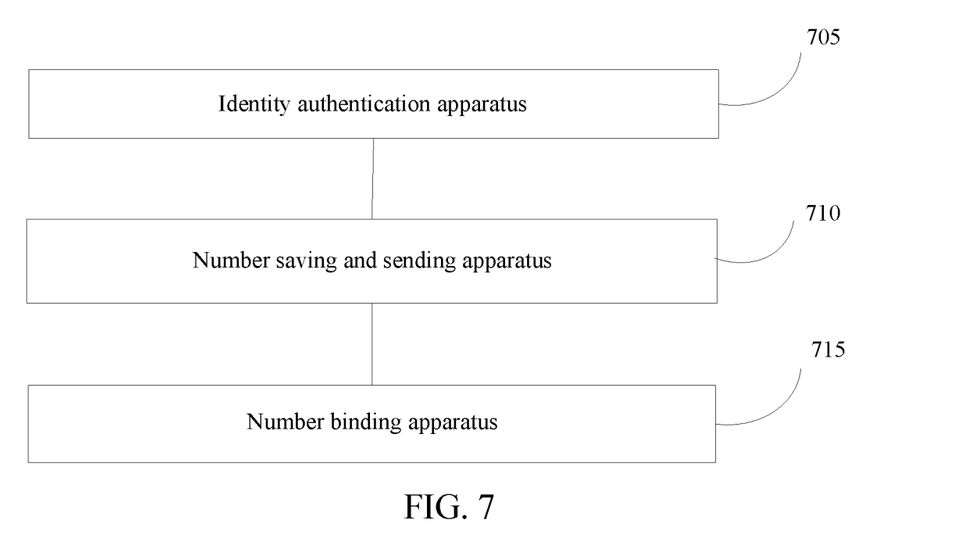
FIG. 7 is a schematic structural diagram of a system for identity authentication, number saving and sending, and number binding, according to an embodiment of this application.

FIG. 7 is a schematic structural diagram of a system for identity authentication, number saving and sending, and number binding, according to an embodiment of this application. The schematic structural diagram includes an identity authentication apparatus 705, a number saving and sending apparatus 710, and a number binding apparatus 715.

A person skilled in the art should understand that the embodiments of this application may be provided as a method, a system, or a computer program product. Therefore, this application may be in a form of complete hardware embodiments, complete software embodiments, or combination of software and hardware. Moreover, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to the embodiments. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a general-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include a form such as a persistent memory, a random-access memory (RAM) and/or a non-transitory memory of computer-readable media, for example, a read-only memory (ROM) or a flash memory (RAM). The memory is an example of the computer-readable medium.

The computer-readable medium includes a persistent medium and a non-persistent medium, a removable medium and a non-removable medium, which may implement storage of information by using any method or technology. The information may be a computer-readable instruction, a data structure, a module of a program or other data. Examples of a storage medium of a computer includes, but is not limited to, a phase change memory (PRAM), a static random access memory (SRAM), a dynamic random access memory (DRAM), or other types of random access memory (RAM), a read-only memory (ROM), an erasable programmable read only memory (EEPROM), a flash memory or another storage technology, a compact disc read-only memory (CD-ROM), a digital versatile disc (DVD) or another optical storage, or a cartridge tape. A magnetic storage of a magnetic tape or a disc, another magnetic storage device, or any other non-transmission medium may be configured to store information that can be accessed by a computing device. Based on the definition in this application, the computer-readable medium does not include transitory computer-readable media (transitory media), such as a modulated data signal and a carrier.

It should also be noted that the terms "include," "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one . . . " does not exclude other same elements in the process, method, article or device which include the element.

The descriptions are merely embodiments of this application, and are not intended to limit the embodiments of this application. For a person skilled in the art, various modifications and changes may be made to this application. Any modifications, equivalent replacements, and improvements made within the spirit and principle of this application shall fall within the scope of the claims of this application.

What is claimed is:

1. A number storing and sending method, comprising:
receiving, by a third-party organization server, a registration number and a corresponding secret token of a user from a server of a data authentication platform;
matching, by the third-party organization server, the received secret token corresponding to the registration number of the user with pre-stored secret tokens associated with pre-stored user identification information of a plurality of users;
in response to the matching succeeding, storing, by the third-party organization server, the received registration number of the user in association with pre-stored user identification information of the user;
receiving, by the third-party organization server, a user number binding request from a client, wherein the user number binding request comprises user authentication information and user identification information;
obtaining, by the third-party organization server according to the user identification information, pre-stored user authentication information from the third-party organization server;
matching, by the third-party organization server, the user authentication information in the received user number binding request with the pre-stored user authentication information obtained from the third-party organization server; and
in response to the matching between the user authentication information in the received user number binding request and the pre-stored user authentication information obtained from the third-party organization server succeeding, sending, by the third-party organization server, the obtained registration number of the user to the client.

2. The method according to claim 1, wherein the third-party organization server pre-stores a unique identification (ID) corresponding to the pre-stored user identification information; and
after receiving the user number binding request from the third-party organization client, the method further comprises: retrieving, by the third-party organization server according to the unique ID, the pre-stored user authentication information from the third-party organization server.

3. The method according to claim 2, wherein the corresponding secret token is irreversibly generated by the server of the data authentication platform according to the registration number, and the secret token is unknown to the user.

4. The method according to claim 1, further comprising:
receiving, by the client, the registration number from the third-party organization server; and receiving, by the client, a confirmation by the user for binding the registration number.

5. The method according to claim 4, wherein receiving the registration number from the third-party organization server comprises:
  receiving a registration number selected by the user and sent by the third-party organization server; or
  receiving each registration number sent by the third-party organization server and obtaining a registration number selected by the user.

6. The method according to claim 1, wherein the registration number corresponds to a payment account, and the method further comprises:
  receiving, by the third-party organization server from the client, a confirmation of the registration number sent from the third-party organization server, wherein the confirmation indicates a success in binding the payment account with a payment application maintained by the third-party organization server and accessible from the third-party organization client.

7. The method according to claim 1, wherein:
  the secret token is encrypted; and
  receiving the secret token of the user from the server of the data authentication platform comprises receiving, via a private security network connection, the secret token of the user from the server of the data authentication platform.

8. One or more non-transitory computer-readable storage media storing instructions executable by one or more processors, wherein execution of the instructions causes the one or more processors to perform operations comprising:
  receiving a registration number and a corresponding secret token of a user from a server of a data authentication platform;
  matching the received secret token corresponding to the registration number of the user with pre-stored secret tokens associated with pre-stored user identification information of a plurality of users;
  in response to the matching succeeding, storing the received registration number of the user in association with pre-stored user identification information of the user;
  receiving a user number binding request from a client, wherein the user number binding request comprises user authentication information and user identification information;
  obtaining, according to the user identification information, pre-stored user authentication information from a third-party organization server;
  matching the user authentication information in the received user number binding request with the pre-stored user authentication information obtained from the third-party organization server; and
  in response to the matching between the user authentication information in the received user number binding request and the pre-stored user authentication information obtained from the third-party organization server succeeding, sending the obtained registration number of the user to the client.

9. The storage media according to claim 8, wherein the third-party organization server pre-stores a unique identification (ID) corresponding to the pre-stored user identification information; and
  after receiving the user number binding request from the third-party organization client, the operations further comprise: retrieving, according to the unique ID, the pre-stored user authentication information from the third-party organization server.

10. The storage media according to claim 9, wherein the corresponding secret token is irreversibly generated by the server of the data authentication platform according to the registration number, and the secret token is unknown to the user.

11. The storage media according to claim 8, wherein the operations further comprise:
  receiving, by the client, the registration number from the third-party organization server; and
  receiving, by the client, a confirmation by the user for binding the registration number.

12. The storage media according to claim 11, wherein receiving the registration number from the third-party organization server comprises:
  receiving a registration number selected by the user and sent by the third-party organization server; or
  receiving each registration number sent by the third-party organization server and obtaining a registration number selected by the user.

13. The storage media according to claim 8, wherein the registration number corresponds to a payment account, and the operations further comprise:
  receiving, from the client, a confirmation of the registration number sent from the third-party organization server, wherein the confirmation indicates a success in binding the payment account with a payment application maintained by the third-party organization server and accessible from the third-party organization client.

14. The storage media according to claim 8, wherein:
  the secret token is in an encrypted form; and
  receiving the secret token of the user from the server of the data authentication platform comprises receiving, via a private security network connection, the secret token of the user from the server of the data authentication platform.

15. A system comprising one or more processors and one or more non-transitory computer-readable memories coupled to the one or more processors and configured with instructions executable by the one or more processors to cause the system to perform operations comprising:
  receiving a registration number and a corresponding secret token of a user from a server of a data authentication platform;
  matching the received secret token corresponding to the registration number of the user with pre-stored secret tokens associated with pre-stored user identification information of a plurality of users;
  in response to the matching succeeding, storing the received registration number of the user in association with pre-stored user identification information of the user;
  receiving a user number binding request from a client, wherein the user number binding request comprises user authentication information and user identification information;
  obtaining, according to the user identification information, pre-stored user authentication information from a third-party organization server;
  matching the user authentication information in the received user number binding request with the pre-stored user authentication information obtained from the third-party organization server; and
  in response to the matching between the user authentication information in the received user number binding request and the pre-stored user authentication information obtained from the third-party organization server succeeding, sending the obtained registration number of the user to the client.

16. The system according to claim 15, wherein the third-party organization server pre-stores a unique identification (ID) corresponding to the pre-stored user identification information; and after receiving the user number binding request from the third-party organization client, the operations further comprise: retrieving, according to the unique ID, the pre-stored user authentication information from the third-party organization server.

17. The system according to claim 16, wherein the corresponding secret token is irreversibly generated by the server of the data authentication platform according to the registration number, and the secret token is unknown to the user.

18. The system according to claim 15, wherein the operations further comprise:

receiving, by the client, the registration number from the third-party organization server; and receiving, by the client, a confirmation by the user for binding the registration number.

19. The system according to claim 18, wherein receiving the registration number from the third-party organization server comprises:

receiving a registration number selected by the user and sent by the third-party organization server; or receiving each registration number sent by the third-party organization server and obtaining a registration number selected by the user.

20. The system according to claim 15, wherein the registration number corresponds to a payment account, and the operations further comprise:

receiving, from the client, a confirmation of the registration number sent from the third-party organization server, wherein the confirmation indicates a success in binding the payment account with a payment application maintained by the third-party organization server and accessible from the third-party organization client.

* * * * *